H. B. JOHNSTON.
WRIST CONNECTION FOR PISTONS.
APPLICATION FILED FEB. 5, 1920.

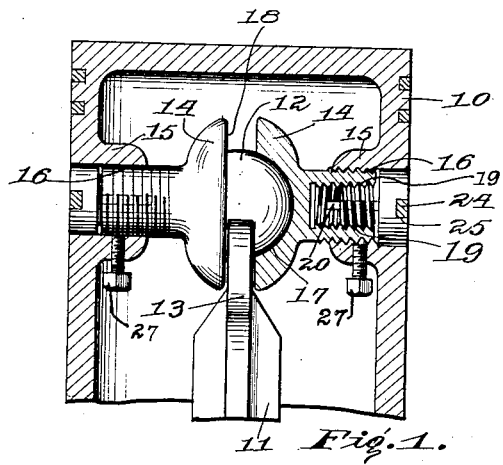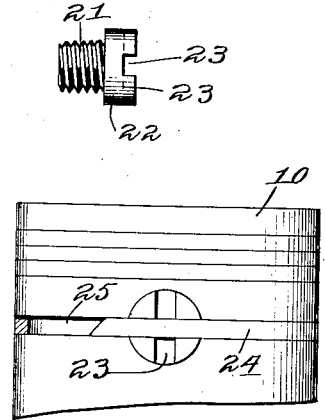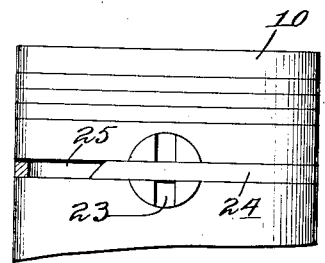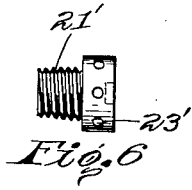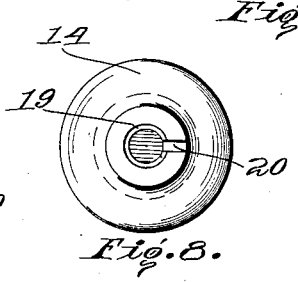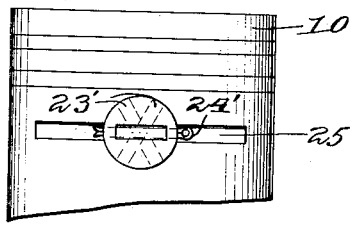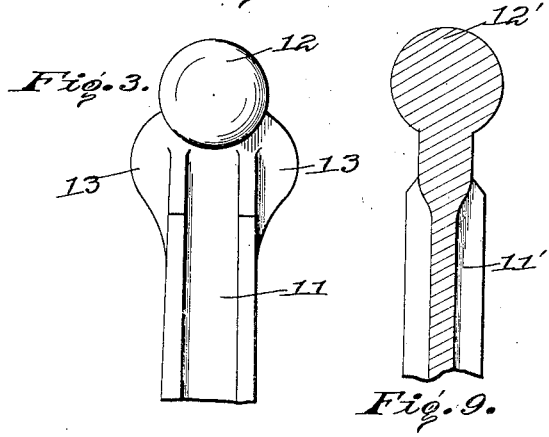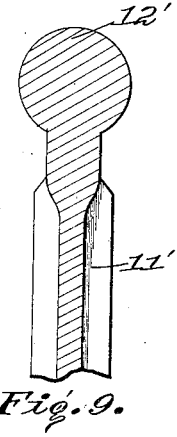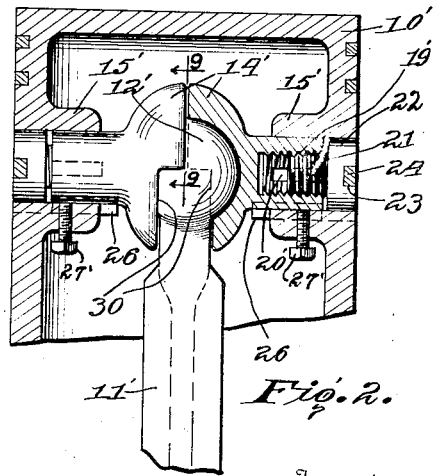

1,409,954.

Patented Mar. 21, 1922.
2 SHEETS—SHEET 2.

Inventor
Harry B. Johnston.

By Walter W. Burns
Attorney

UNITED STATES PATENT OFFICE.

HARRY B. JOHNSTON, OF SEATTLE, WASHINGTON.

WRIST CONNECTION FOR PISTONS.

1,409,954.   Specification of Letters Patent.   Patented Mar. 21, 1922.

Application filed February 5, 1920. Serial No. 356,443.

*To all whom it may concern:*

Be it known that I, HARRY B. JOHNSTON, a citizen of the United States, residing at Seattle, in the county of King and State of Washington, have invented certain new and useful Improvements in Wrist Connections for Pistons, of which the following is a specification.

This invention relates to wrist connections for pistons and connecting rods.

Its principal object is the provision of a single ball and socket wrist connection which is adjustable back and forth in the plane of the axis of the crank shaft and within the piston thereby rendering perfect action possible between the piston and the connecting rod.

Another object is the provision of such a rod having a side adjustment wherein wear at the sides can be taken up thereby doing away with the usual "slap" of the rod against the piston due to the play of the wrist bearing along the wrist pin.

Another object of this invention is the provision of such a ball and socket wrist connection which will permit the piston to turn around, thus permitting the surface of the piston to come in contact with a different place in the cylinder each time an explosion takes place and also distributing the wear to all points in the ball and socket connection.

Referring to the drawings where preferred embodiments of my invention are illustrated:—

Figure 1 is a cross section of a piston and wrist connection constructed in accordance with my invention.

Figure 2 is a cross section of a modification of the structure shown in Fig. 1.

Figure 3 is an elevational view of the upper end of the connecting rod taken at 90° from the showing of the rod in Fig. 1.

Fig. 4 is a side view of one form of the expansion bolt for one of the connecting rod bearings.

Fig. 5 is an elevation of a portion of the piston showing a method of preventing the expanding bolt from turning.

Fig. 6 is a side elevation of an expansion bolt having a slightly different head.

Fig. 7 is a side fragmental elevation of the piston showing a slightly different method of prevention of the turning of the expansion bolt.

Fig. 8 is a side view of the bearing member 14 showing the split in the side whereby the cylindrical portion is expanded in its threaded bearing.

Fig. 9 is a cross section of the connecting rod on the line 9—9 of Figure 2.

Like reference characters refer to similar parts throughout the several views.

Figure 10:
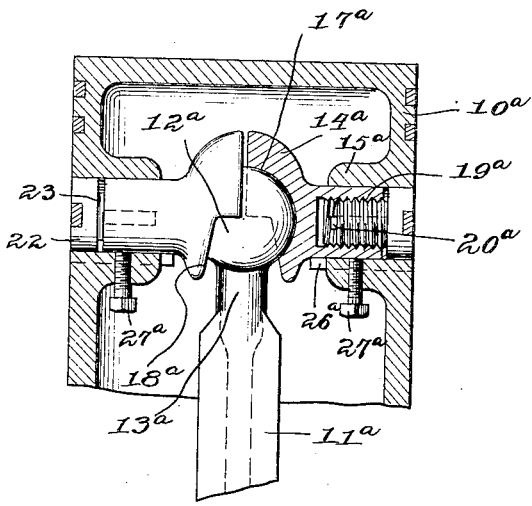
Figure 10 is a cross section of a modification of my invention showing a form wherein the piston is not held against rotation on the connecting rod but which is so designed as to permit easy rotation.
Figure 13:
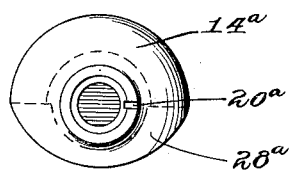
Figures 12 and 13 are detail views of the bearing member 14ª of the modification of Figures 10 and 11.
Figure 12:
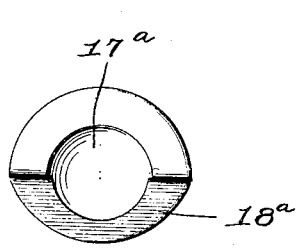

Referring particularly to Figures 1 and 3, 10 designates the piston, 11 the connecting rod and 12 the head of the connecting rod. This head 12 is of substantially spherical shape and has wings 13 to strengthen the connection between the head of the rod and the main body portion thereof.

Connecting the head 12 to the piston 10 are bearing members 14 which are threaded in the bosses 15 at 16. In the inner end of the bearing members 14 are complementary bearings 17 which contact with the ball head 12. At the inner sides of the bearing members 14 are faces 18 which come, when in place, in close proximity to the wings 13 of the connecting rod 11. The correlation between the wings and the faces 18 is such that the members 14 and consequently the piston 10 are prevented from turning in the cylinder.

The bearing member 14 is interiorly threaded with a tapered thread 19 and is split as at 20 in Fig. 8.

Co-operating with the threads 19 is the expansion bolt 21 shown in Figure 4. This bolt 21 has a head 22 which has several slots 23 across the face thereof. When the plug 21 is screwed into the tapered hole of the bearing member 14, the split 20 permits the hollow portion to expand against the threads 16 in the bosses 15 and the bearing member is securely held in position. The set screws 27 afford additional securing means for the bearing members 14.

The slots 23 are provided to receive a ring 24 which seats in the groove 25. When the bolt 21 is in place, the ring is placed in the groove 25 of the piston and the corresponding groove 23 of the bolt. This arrangement is provided as a precaution against the unscrewing of the bolt and consequent scoring of the cylinder wall.

Another form of bolt and securing means therefor is shown in Figures 6 and 7. Referring to these figures, 21' designates the tapered bolt having a head 22'. This head 22' is provided with holes 23' for reception of the cotter pin 24'.

When the bolt 21 is in place in the threaded portion of the bearing member 14, the cotter pin 24' is placed in the hole 23' and its ends separated as shown in Figure 7. This cotter pin 24' lies below the surface of the piston and in the slot 25'. Since this prevents turning of the bolt 21', the latter cannot unscrew and score the cylinder. Many other forms of securing means may be provided for the expansion bolts.

In assembling the bearing members 14 and the connecting rod, one of the bearing members is first put in place and screwed out as far as it can go. The other one is now put in place and screwed to its outer limit. The ball head 12 may now pass both bearing members. While the ball 12 is between the two bearing members, the latter are screwed in until they meet the bolt. It will be clear from the above that by adjusting the bearing members with relation to each other and both relative to the piston that an infinite number of positions for the ball with relation to the piston, may be obtained.

When the bearing members are in place the set screws 27 are tightened and the expansion bolts put in place. These latter are secured by the ring 24 or the cotter pins 24' as the case may be.

Referring now particularly to Figure 2, 14' designates two bearing members which are slidably keyed within the bosses 15' of the piston 10'. The keys 26 are placed in registering keyways in the bosses 15' and bearing members 14'. The keys are preferably placed at one side of the set screws 27'. The interior of the outer end of the bearing member 14' is provided with threads 19' in which are placed the tapered bolt 21 having head 22 with slots 23 therein. The bearing member 14' has a split 20' similar to the split 20 of the form shown in Figure 1.

The connecting rod shown in Figures 2 and 9 differs from that of Figures 1 and 3 in that a square portion is used to attach the body to the ball of the rod. This square portion contacts with the surfaces 30 of the bearing members 14' and holds the piston against rotary movement, as do the wings 13 of Figures 1 and 3.

It is to be noted that the inner cut-away portions of the bearing members 14', extend to just above the middle of the ball and that on the top of the ball, they come substantially together. This structure is particularly useful in the assembling of the device, which operation I will now describe.

In assembling the parts, one of the bearing members is put in place and forced outward as far as possible. This one may have its key 26 therein. The other bearing member is then put in place without its key and in an inverted position having the normally upper portion of each bearing member engaging the cut-away portion of the other. It will thus be seen that longer bosses may be used. As soon as the bearing member is in place the key is put in through the outer opening in the piston.

With the bearing members in their outermost positions, the ball 12' of the connecting rod is put in place, after which the bearing members are brought in to hold the ball. The set screw 27' is then tightened after which the tapered expansion bolt is put in place to expand the split-cylindrical portion of the member 14'. The expansion bolt is secured in one of the illustrated or any preferred way.

Figure 11:
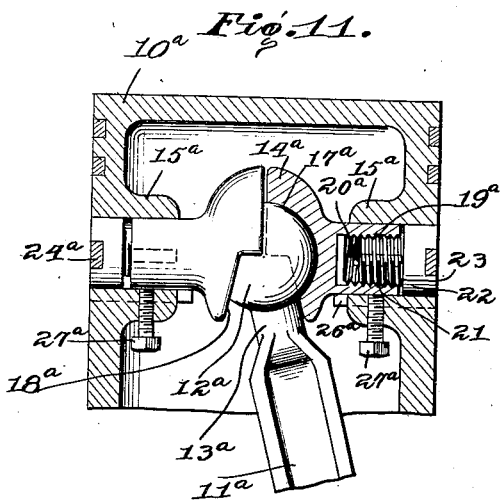
Figure 11 is a cross section similar to Fig. 10 showing the connecting rod turned 90 degrees from the position shown in Fig. 10.

Figures 10 and 11 show a modification of the structure shown in Figure 2 wherein the bearing members and connecting rod are so constructed that the piston is free to turn on the wrist connection.

Referring to these figures 10$^a$ designates the piston, 11$^a$ the rod having a ball 12$^a$ on its piston end. 13$^a$ designates a cylindrical connecting portion between the ball head and the main body of the rod 11$^a$; 14$^a$ are bearings for the heads 12$^a$ similar to the bearings 14' except that the lower portion is cut away to permit the piston to turn to any position and clear the cylindrical portion 13$^a$ as shown at 18$^a$.

The bearing members 14$^a$ are slidably mounted in bosses 15$^a$. 17$^a$ designates the spherical bearing surface for the ball head 12$^a$. The bearing member 14$^a$ is interiorly threaded at 19$^a$ to receive the expansion bolt 21. A split 20$^a$ is provided in order to permit the walls of the hollow cylindrical portion to expand when the expansion bolt 21 is put in place. The bolt 21 is secured as described for the structures of Figures 1 and 2, and the assembly of parts is similar to that described for the structure of Figure 2.

It will thus be seen that I have provided a ball and socket wrist connection between the piston and connecting rod which is adjustable and which is securely held in place.

It will also be seen that I have provided a ball and socket connection between a piston and its connecting rod, which may be so constructed as to permit free rotary movement of the piston with relation to the rod and cylinder. This has the advantage of distributing the wear on all parts and thus having a tendency to maintain all parts in proper shape.

While I have illustrated my invention in connection with an engine of the internal combustion type, I desire to have it understood that it is applicable to other forms where a similar connection is desired.

While I have set forth in detail my preferred embodiments, I desire to have it understood that my invention is not limited to the specific structures shown and described and that modifications and changes may be made within the scope of the appended claims.

Having described my invention, what I claim is:—

1. In combination, a piston, bearing members adjustably secured to the piston at opposite sides thereof, and having complementary bearings facing each other and being substantially spherical in form, a connecting rod having a substantially spherical head cooperating with the complementary bearings, and means for securing the bearing members in adjusted position.

2. In combination, a piston, bearing members adjustably secured in the piston and having substantially hemispherical complementary bearings facing each other, and having hollow threaded portions for engagement with the piston, expansion bolts for securing the hollow portions in adjusted position in the pistons and a connecting rod having a substantially spherical head in cooperation with the bearings.

3. In combination a piston, bearing members adjustably threaded in the piston and having substantially hemispherical complementary bearings facing each other and having hollow threaded portions for engagement with the piston, expansion bolts for cooperation with the threaded portions to secure the same to the piston and a connecting rod having a substantially spherical head in cooperation with the bearings.

4. In combination, a piston, a pair of bearing members having portions slidably mounted in the piston and adjustable in two directions normal to the piston axis, complementary bearings on the bearing members and facing each other, means for securing the bearing members in adjusted position, a connecting rod having a bearing head cooperating with the bearings of the bearing members.

5. In combination, a piston, a pair of bearing members having portions slidably mounted in the piston and adjustable in two directions normal to the piston axis, complementary bearings on the bearing members and facing each other, means comprising an expansion bolt threaded in the bearing member for securing the bearing members in adjusted position, a connecting rod having a bearing head cooperating with the bearing of the bearing members.

6. In combination, a piston, a connecting rod, a pair of bearings mounted in the piston and being adjustable relative to each other and normal to the piston axis and having partial hollow complementary spherical bearing surfaces thereon, a head on the connecting rod to contact with the bearing surfaces of the bearings, said bearings being cut away to permit rotary movement of the piston relative to the piston rod and cylinder.

In testimony whereof I affix my signature.

HARRY B. JOHNSTON.